United States Patent
Megas et al.

(10) Patent No.: US 6,883,308 B2
(45) Date of Patent: Apr. 26, 2005

(54) UREA INJECTOR IN EXHAUST GAS TURBINE HOUSING

(75) Inventors: Lucan Megas, Göteborg (SE); Lennart Zander, Mölndal (SE); Lennart Andersson, Varberg (SE); Mats Holmqvist, deceased, late of Göteborg (SE); by Kristin Holmqvist, legal representative, Göteberd (SE)

(73) Assignee: Volvo Lastvagnar AB, Göteborg (SE)

( * ) Notice: Subject to any disclaimer, the term of this patent is extended or adjusted under 35 U.S.C. 154(b) by 0 days.

(21) Appl. No.: 10/248,073

(22) Filed: Dec. 16, 2002

(65) Prior Publication Data

US 2004/0103643 A2 Jun. 3, 2004

Related U.S. Application Data

(63) Continuation of application No. PCT/SE01/01304, filed on Jun. 8, 2001, now abandoned.

(30) Foreign Application Priority Data

Jun. 14, 2000 (SE) .............................................. 0002229

(51) Int. Cl.$^7$ ................................................ F01N 3/00
(52) U.S. Cl. ............................. 60/280; 60/286; 60/295; 60/303; 60/601; 60/606
(58) Field of Search .......................... 60/280, 286, 287, 60/291, 295, 303, 601, 602, 606

(56) References Cited

U.S. PATENT DOCUMENTS

| | | | | |
|---|---|---|---|---|
| 4,322,949 A | * | 4/1982 | Byrne et al. .................. | 60/606 |
| 5,116,579 A | | 5/1992 | Kobayashi et al. ......... | 422/111 |
| 5,209,062 A | * | 5/1993 | Vollenweider ............... | 60/280 |
| 5,309,718 A | * | 5/1994 | Loving ........................ | 60/722 |
| 5,605,042 A | | 2/1997 | Stutzenberger .............. | 60/286 |
| 5,697,211 A | * | 12/1997 | Kawaguchi .............. | 60/39.512 |
| 5,976,475 A | | 11/1999 | Peter-Hoblyn et al. ..... | 423/212 |
| 6,006,515 A | | 12/1999 | Wakamoto .................... | 60/274 |
| 6,092,359 A | * | 7/2000 | Ackermann et al. .......... | 60/783 |

FOREIGN PATENT DOCUMENTS

| | | | | |
|---|---|---|---|---|
| DE | 03826600 A | * | 2/1990 | .................. 60/606 |

* cited by examiner

*Primary Examiner*—Binh Q. Tran
(74) *Attorney, Agent, or Firm*—Novak Druce & Quigg LLP

(57) ABSTRACT

Vehicle powered by a combustion engine having an exhaust pipe, a turbine housing connected to the exhaust pipe which exhibits an inlet opening, an outlet opening, a chamber located between the inlet opening and outlet opening in which a turbine wheel is rotatably arranged on a rotational shaft which is mounted in bearings in the housing and extends through a through-hole in the chamber. An injector is provided for injecting urea while the combustion engine is in a predetermined operating conditions into exhaust gases generated by the combustion engine.

10 Claims, 2 Drawing Sheets

UREA INJECTOR IN EXHAUST GAS TURBINE HOUSING

CROSS REFERENCE TO RELATED APPLICATIONS

This application is a continuation patent application of International Application No. PCT/SE01/01304 filed 8 Jun. 2001 now abandoned which was published in English pursuant to Article 21(2) of the Patent Cooperation Treaty, and which claims priority to Swedish Application No. 0002229-3 filed 14 Jun. 2000. Both applications are expressly incorporated herein by reference in their entireties.

BACKGROUND OF INVENTION

1. Technical Field

The present invention relates to a combustion engine in which the emission level of nitrogen oxides emitted to the environment is reduced by means of injecting urea into the exhaust pipe. The present invention also relates to a vehicle utilizing such an engine.

2. Background of the Invention

Diesel and petrol engines that are designed for lean operation, so-called lean-burn engines, exhibit good properties where fuel economy is concerned, though in normal operation generate particles and nitrogen oxides, NOx. A number of previously known methods can be utilized in order to reduce the amount of NOx in the exhaust gases. For instance, the combustion process can be cooled down by means of recirculation of exhaust gases, or the introduction of cooling medium in the form of water into the combustion chambers can be performed. These processes are utilized in order to reduce the formation of NOx in the combustion process. Another possibility is to reduce the amount of NOx in exhaust gases that have already been formed. One method for reducing the NOx content occurring in exhaust gases is to reduce NOx in a selective, reducing catalytic converter where reduction of NOx takes place influenced by urea. Accordingly, for this purpose, urea is injected into the exhaust pipe of the combustion engine, whereafter reaction takes place in a reaction chamber.

An example of a device for NOx-reduction at a combustion engine is disclosed in U.S. Pat. No. 5,976,475, the disclosure of which is hereby incorporated herein by reference. In order to obtain high efficiency of the injected urea quantity in relation to the amount of NOx present in the exhaust pipe, it is required that the injected urea be mixed thoroughly with the exhaust gases. This is of particular importance, since the time of exposure inside the exhaust pipe is short as a result of the relatively high flow rate through the system. In the device disclosed in the above-mentioned document, urea is injected upstream of a turbine located in the exhaust pipe in order to achieve a thorough mixing of exhaust gases and urea.

As a result of the positioning of the injection site upstream of the turbine, the injected urea passes through the entire turbine housing and, accordingly, also in the vicinity of the rotational shaft of the turbine wheel that is mounted in bearings in the housing enclosing the turbine wheel. The rotational shaft is mounted in bearings in a through-hole in the housing. When the urea passes this through-hole, there is a risk of urea penetrating the bearing assembly of the rotational shaft in the housing, since the pressure inside the housing is higher than the ambient pressure. Since urea is very reactive and aggressive, there is a risk of the urea degrading the bearing assembly, seals and lubricant that are present therein.

SUMMARY OF INVENTION

An object of the present invention is to provide a combustion engine in which urea is injected into the exhaust pipe of the combustion engine. Thorough mixing of the urea and exhaust gases is accomplished by at least partially passing these contents through a turbine step, but in such a way that the risk of degradation of a bearing assembly, seals and lubricant for a rotational shaft of a turbine wheel included at the turbine step is reduced. By means of arranging an injector for injecting urea into the housing which encloses the turbine wheel included in the turbine step, injection is enabled in such a position that the risk of bearing assembly, seals and lubricant for the rotation axis being degraded is reduced.

In a preferred embodiment, the injector is arranged in the chamber that encloses the turbine wheel, preferably downstream of the largest diameter of the turbine wheel. By arranging the injector jet within a region where the static pressure is lower than the static pressure at the through-hole for the rotational shaft, the risk of the through-hole being exposed to urea is reduced even further.

Furthermore, according to another preferred embodiment of the invention, the injector jet is positioned in the turbine housing in a position where a mean flow trajectory does not pass past the through-hole for the turbine shaft. This means that the injector jet can be located upstream the largest diameter of the turbine wheel, and that the static pressure at the injector jet may exceed the static pressure at the through-hole for the turbine shaft, but that there is a high probability that the particle trajectory for the injected urea does not pass past the through-hole, wherein a reduction of the exposure of the through-hole to urea is obtained, and the risk of bearing assembly, seals and lubricant being degraded is reduced.

BRIEF DESCRIPTION OF DRAWINGS

In the following, the invention will be described in greater detail with reference to attached drawings, in which.

DETAILED DESCRIPTION

Figure 1:
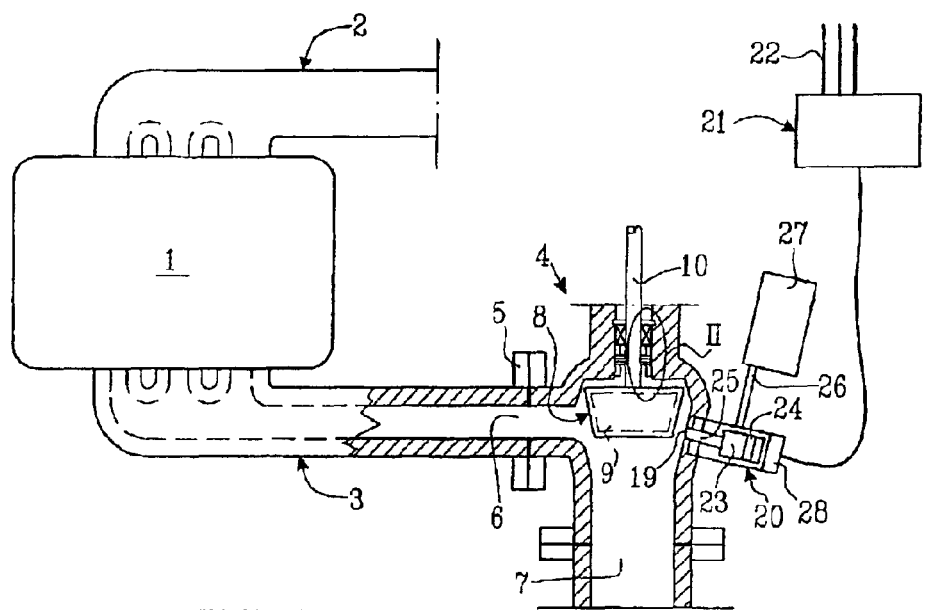
FIG. 1 shows a schematic illustration of a combustion engine configured according to the invention.

FIG. 1 is a schematic representation of a combustion engine 1. The combustion engine 1 is preferably constituted by a diesel engine, or alternatively a petrol engine, and which is adapted for lean operation; that is, a so-called lean-burn engine. An inlet manifold 2 is connected to the combustion engine for air supply to the engine. Furthermore, an exhaust pipe 3 is connected to the outlet ports of the combustion engine 1. The combustion engine 1 is exemplarily of a conventional type, which is the reason why the remaining components required for the operation of the engine are not described in any greater detail.

A turbine housing 4 is connected to the exhaust pipe 3. The connection between the turbine housing 4 and the exhaust pipe 3 can be designed as a flange joint 5 whereby the turbine housing 4 and the exhaust pipe 3 are connected. Accordingly, the turbine housing exhibits an inlet opening 6 and an outlet opening 7 connected to an exhaust pipe. A chamber 8 in which a turbine wheel 9 is arranged is located between the inlet opening 6 and the outlet opening. The turbine wheel 9 is supported by a rotational shaft 10 which extends through a through-hole 11 in the turbine housing 4.

Figure 2:
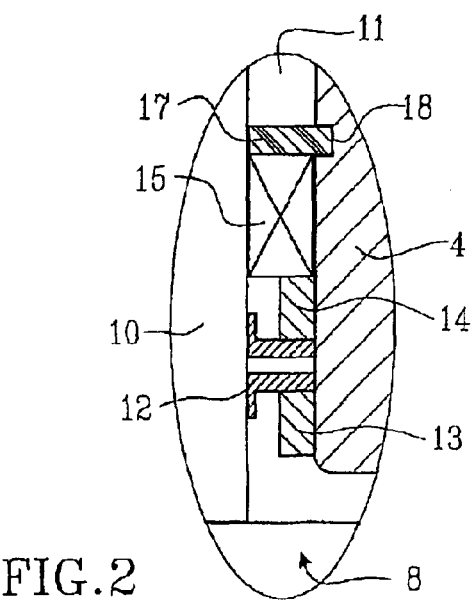
FIG. 2 shows an enlargement of the region 11 in FIG. 1.

FIG. 2 shows an embodiment of the bearing assembly of the rotational shaft 10 in the through-hole 11 in greater detail. Closest to the orifice of the through-hole 111 into the chamber 8, a sealing member 12, which prevents leakage out from the chamber 8 into the environment, is arranged. In addition to the above-mentioned degradation of lubricant in the bearing assembly of the rotational shaft 10, a leakage in the exhaust pipe also results in power loss, since a loss of pressure occurs in the exhaust pipe without any possibility to recover the energy in the exhaust gases. In a direction towards the orifice of the through-hole 11 into the chamber 8, the sealing member 12 rests against a protrusion 13 arranged in the housing 4. The end of the sealing member 12 facing away from the orifice rests against a spacing member 14, which can be constituted by a portion of a bearing assembly 15. In one embodiment, the bearing assembly 15 is constituted by a conventional plain bearing 15 which is secured by a locking washer 17 arranged in a groove 18.

Furthermore, according to the invention, the turbine housing 4 is provided with an orifice 19 of an injector 20 for injecting urea into the turbine housing 4 while the combustion engine 1 is in a predetermined operating condition. In order to verify that the injection is performed in the correct way, according to one embodiment of the invention, the injector 20 is connected to a control unit 21 which, via a set of input channels 22, obtains information about relevant vehicle or engine data, such as load, engine speed, engine temperature, and the like. The control unit is of a conventional type therefore will not be described in any greater detail.

The injector 20 can be of a conventional type. For example, the one shown in FIG. 1 can include a piston 24 arranged inside a cylinder 23. The piston 24 divides the cylinder into a first portion facing an orifice 25 that forms a duct (together with a duct of a through-hole located in the turbine housing 4) that terminates in an injection orifice 19. A second portion includes a means or arrangement 28 for pressurizing the urea contained in the first portion, and as a result of such pressuring, the urea in the first portion is caused to be injected into the turbine housing 4. Conveniently, the injector 20 is connected to the turbine housing 4 by means of screwing an externally threaded portion of the injector 20 into a recess in the turbine housing 4 that has a mating internal thread. A supply duct 26, which connects a urea container 27 to the first portion of the cylinder 23, is arranged for supplying urea to the first portion of the cylinder 23. By utilizing the pressuring means or arrangement 28 to pressurize the urea in the first portion of the cylinder 23, for example by acting on the piston 24, the urea is injected into the turbine housing 4. In another embodiment of the invention, the injector 20 may be established through the utilization of an on/off-valve that opens and closes an inlet port leading into the turbine housing 4. In this configuration, a conventional pump can be arranged for pressurizing the urea in order to enable transport into the turbine housing 4 when the valve is opened.

In another aspect of the invention, the injector jet can be specially arranged at the turbine housing for jetting the urea either from a specific location, or in a specific direction within the exhaust system. Regarding this second aspect, this unique configuration may be considered a special aiming of the injection of the urea at or near the turbine housing. In a preferred embodiment, the injector jet is installed at the chamber 8 that encloses the turbine wheel at a location downstream of a largest diameter of the turbine wheel 9. As a result of this position, passage of urea into the through-hole 11 in the turbine housing 4 for the rotational shaft 10 is made more difficult, wherein degradation of bearing assembly, seals and lubricants placed within the lead-through is reduced.

In another preferred embodiment, the injector discharges into the chamber within a region where the static pressure is lower than the static pressure at the through-hole for the rotational shaft. As a result of this position, the exposure of the through-hole to urea is reduced even further.

In still another embodiment of the invention, the injector discharges into the housing from a position where a mean flow trajectory does not pass past the through-hole. In this respect, "mean flow trajectory" refers to the trajectory a particle having a certain kinetic energy and direction of movement will exhibit when it is introduced into the exhaust gas flow. Since the flow is turbulent, the trajectory will not be identical in every case. Accordingly, "mean flow trajectory" refers to the trajectory an average of the introduced particles will exhibit. "Passes past the through-hole of the rotational shaft" means that a particle trajectory flows through a boundary layer surrounding the through-hole where the probability of passage through the through-hole into the bearing assembly of the rotational shaft is high. This boundary layer is relatively thin and of the magnitude of 1–10 mm.

Figure 3:
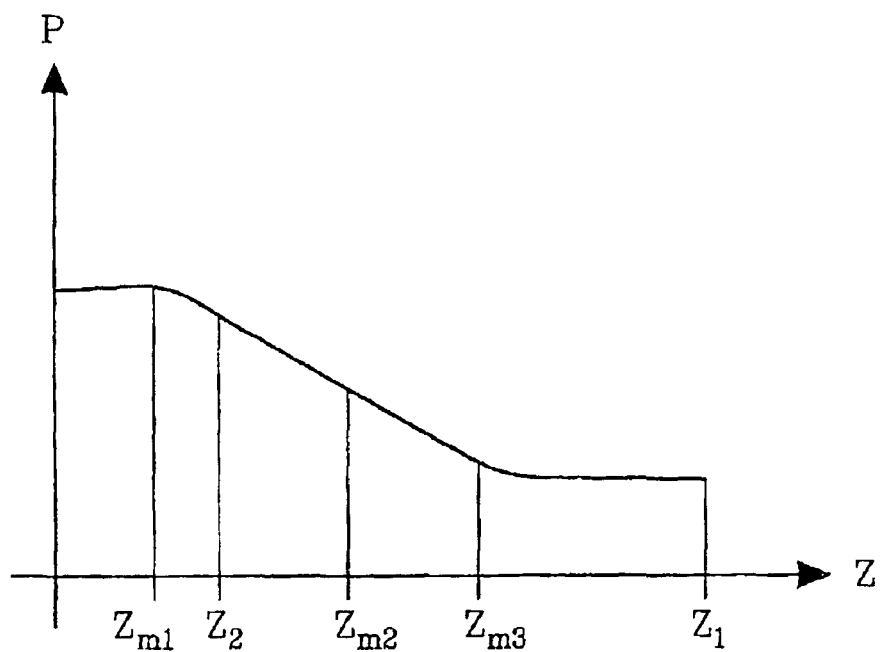
FIG. 3 shows a simplified, two-dimensional illustration of the pressure at different positions inside the turbine housing.

FIG. 3 shows a simplified diagram of the static pressure through the turbine housing. The static pressure, P, as a function of a transformed longitudinal coordinate Z, which has its zero value at the inlet opening 6 of the turbine housing and the value $Z_1$ at the outlet opening 7 of the turbine housing. There is of course also a pressure variation in a radial direction of the turbine; this, however, is neglected in order to provide a more simplified illustration of the pressure variation. The static pressure at the through-hole 11 for the rotational shaft 10 is $P(Z_2)$. The injector jet can be positioned in different positions in the turbine housing, for example in the position $Zm_1$ where the static pressure exceeds the static pressure at the through-hole, or in the position $Zm_2$ where the static pressure is lower than the static pressure at the through-hole. Should the injector jet be positioned in the position $Zm_1$; that is, where the static pressure exceeds the static pressure at the through-hole, the injector will then preferably be directed in a downstream direction so that the risk of exposure to urea is reduced at the through-hole. Should the injector jet be positioned sufficiently far downstream of the chamber 8 in the housing 4 that there is little risk of exposure to urea at the through-hole 11, such as in the position characterized as $Zm_3$, the injector jet can be directed or aimed upwards, that is upstream toward the hole 11 for improving the mixing degree of urea and exhaust gas. In this respect, the initial velocity of the injected urea into the exhaust flow should be adapted so that a mean flow trajectory of the urea does not pass past the through-hole 11.

What is claimed is:

1. An exhaust arrangement for an internal combustion engine, said arrangement comprising:

a turbine housing having an inlet opening adapted to receive exhaust gases from a combustion engine into said housing and an outlet opening adapted to convey urea-treated exhaust gases out of said housing;

a turbine located in said housing in an exhaust gas flow path between said inlet opening and outlet opening, said turbine including a turbine wheel arranged on a rotational shaft, said rotation shaft being positioned in a through-hole into said housing; and an urea injector having an outlet orifice located in said housing for injecting urea directly thereinto for mixture with exhaust gases in said housing for the purpose of reducing the NOx content of the receiving exhaust gases, said injector being configured to minimize contact of injected urea with said through-hole.

2. The arrangement as recited in claim 1, wherein said outlet orifice of said urea injector is located in said turbine housing between said turbine and said inlet opening and said injector is configured to aim injected urea away from said through-hole.

3. The arrangement as recited in claim 1, wherein said outlet orifice of said urea injector is located in said turbine housing between said turbine and said outlet opening and said injector is configured to aim injected urea toward said through-hole.

4. The arrangement as recited in claim 1, wherein said outlet orifice of said urea injector is located in said turbine housing between said turbine and said inlet opening.

5. The arrangement as recited in claim 1, wherein said outlet orifice of said urea injector is located in said turbine housing between said turbine and said outlet opening.

6. A combustion engine powered vehicle comprising:

a vehicle powered by a combustion engine, said engine being associated with an exhaust arrangement for treating and carrying exhaust gases away therefrom;

said exhaust arrangement including a turbine housing having an inlet opening adapted to receive exhaust gases from a combustion engine into said housing and an outlet opening adapted to convey urea-treated exhaust gases out of said housing;

a turbine located in said housing in an exhaust gas flow path between said inlet opening and outlet opening, said turbine including a turbine wheel arranged on a rotational shaft, said rotation shaft being positioned in a through-hole into said housing; and an urea injector having an outlet orifice located in said housing for injecting urea directly thereinto for mixture with exhaust gases in said housing for the purpose of reducing the NOx content of the receiving exhaust gases, said injector being configured to minimize contact of injected urea with said through-hole.

7. The arrangement as recited in claim 6, wherein said outlet orifice of said urea injector is located in said turbine housing between said turbine and said inlet opening and said injector is configured to aim injected urea away from said through-hole.

8. The arrangement as recited in claim 6, wherein said outlet orifice of said urea injector is located in said turbine housing between said turbine and said outlet opening and said injector is configured to aim injected urea toward said through-hole.

9. The arrangement as recited in claim 6, wherein said outlet orifice of said urea injector is located in said turbine housing between said turbine and said inlet opening.

10. The arrangement as recited in claim 6, wherein said outlet orifice of said urea injector is located in said turbine housing between said turbine and said outlet opening.

* * * * *

UNITED STATES PATENT AND TRADEMARK OFFICE
CERTIFICATE OF CORRECTION

| | | |
|---|---|---|
| PATENT NO. | : 6,883,308 B2 | Page 1 of 1 |
| APPLICATION NO. | : 10/248073 | |
| DATED | : April 26, 2005 | |
| INVENTOR(S) | : Megas et al. | |

It is certified that error appears in the above-identified patent and that said Letters Patent is hereby corrected as shown below:

TITLE PAGE, ITEM (75), the name of the first inventor should read:  --Lucas Megas--

Signed and Sealed this

Twenty-fifth Day of July, 2006

JON W. DUDAS
*Director of the United States Patent and Trademark Office*